United States Patent
Spoerke et al.

(10) Patent No.: US 11,258,096 B2
(45) Date of Patent: Feb. 22, 2022

(54) MOLTEN INORGANIC ELECTROLYTES FOR LOW TEMPERATURE SODIUM BATTERIES

(71) Applicant: National Technology & Engineering Solutions of Sandia, LLC, Albuquerque, NM (US)

(72) Inventors: Erik David Spoerke, Albuquerque, NM (US); Stephen Percival, Albuquerque, NM (US); Leo J. Small, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 134 days.

(21) Appl. No.: 16/564,751

(22) Filed: Sep. 9, 2019

(65) Prior Publication Data
US 2021/0075059 A1 Mar. 11, 2021

(51) Int. Cl.
| | | |
|---|---|---|
| *H01M 10/0563* | (2010.01) | |
| *H01M 4/36* | (2006.01) | |
| *H01M 4/66* | (2006.01) | |
| *H01M 4/38* | (2006.01) | |
| *H01M 10/054* | (2010.01) | |

(52) U.S. Cl.
CPC ....... *H01M 10/0563* (2013.01); *H01M 4/368* (2013.01); *H01M 4/381* (2013.01); *H01M 4/661* (2013.01); *H01M 4/663* (2013.01); *H01M 10/054* (2013.01); *H01M 2300/0048* (2013.01)

(58) Field of Classification Search
CPC ........ H01M 4/0476; H01M 4/36; H01M 4/38; H01M 2300/0048; H01M 2300/0057; H01M 2300/0054; H01M 10/05; H01M 10/056; H01M 10/39
See application file for complete search history.

(56) References Cited

U.S. PATENT DOCUMENTS

| | | | |
|---|---|---|---|
| 9,553,337 B2 | 1/2017 | Chae et al. | |
| 2015/0147619 A1* | 5/2015 | Chae | H01M 10/399 |
| | | | 429/104 |
| 2016/0049658 A1* | 2/2016 | Chae | H01M 10/0568 |
| | | | 429/104 |

FOREIGN PATENT DOCUMENTS

| | | | | |
|---|---|---|---|---|
| JP | 10144343 A | * | 5/1998 | |
| WO | WO-2018187777 A1 | * | 10/2018 | H01M 4/80 |

OTHER PUBLICATIONS

Small, Leo J., Paul G. Clem, and Erik David Spoerke. Electroless Process for Depositing Tungsten Metal for Sodium Battery Electrodes. No. SAND2016-9318C. Sandia National Lab.(SNL-NM), Albuquerque, NM (United States), 2016. (Year: 2016).*
Goodenough, J.B. "Electrochemical Energy Storage in a Sustainable Modern Society", Energy Environ. Sci., vol. 7 (2014), pp. 14-18.
Yang, Z. et al., "Electrochemical Energy Storage for Green Grid", Chem. Rev., vol. 111 (2011), pp. 3577-3613.
(Continued)

*Primary Examiner* — Maria Laios
*Assistant Examiner* — Grace Ann Kenlaw
(74) *Attorney, Agent, or Firm* — Kevin W. Bieg

(57) ABSTRACT

A molten sodium-based battery comprises a robust, highly Na-ion conductive, zero-crossover separator and a fully inorganic, fully liquid, highly cyclable molten cathode that operates at low temperatures.

14 Claims, 3 Drawing Sheets

Na-Nal battery:

$Na \rightarrow Na^+ + e^-$    $E^0 = 0V$ $I_3^- + 2e^- \rightarrow 3I^-$    $E^0 = 3.24$ $2Na + I_3^- \rightarrow 2Na^+ + 3I^-$    $E^0_{cell} = 3.24V$

(56) References Cited

OTHER PUBLICATIONS

Ha, S. et al., "Sodium-Metal Halide and Sodium-Air Batteries", ChemPhysChem, vol. 15 (2014), pp. 1971-1982.

Sudworth, J.L., "The Sodium/Nickel Chloride (ZEBRA) Battery", Journal of Power Sources, vol. 100 (2001), pp. 149-163.

Kumar, D. et al., "Progress and Prospects of Sodium-Sulfur Batteries: A Review", Solid State Ionics, vol. 312 (2017), pp. 8-16.

Dunn, B. et al., "Electrical Energy Storage for the Grid: A Battery of Choices", Science, vol. 334 (2011), pp. 928-935.

Hueso, K.B. et al., "High Temperature Sodium Batteries: Status, Challenges and Future Trends", Energy Environ. Sci., vol. 6 (2013), pp. 734-749.

Lu, X. et al., "Liquid-Metal Electrode to Enable Ultra-Low Temperature Sodium-Beta Alumina Batteries for Renewable Energy Storage", Nature Communications, vol. 5 (2014), 4578, 8 pages.

Manthiram, A. et al., "Ambient Temperature Sodium-Sulfur Batteries", Small, vol. 11, No. 18 (2015), pp. 2108-2114.

Liu, C. et al., "An Ambient Temperature Molten Sodium-Vanadium Battery with Aqueous Flowing Catholyte", ACS Appl. Mater. Interfaces, vol. 8 (2016), pp. 1545-1552.

Pang, W.-L., et al., "P2-type Na2/3Mn1—xAlxO2 Cathode Material for Sodium-Ion Batteries: Al-Doped Enhanced Electrochemical Properties and Studies on the Electrode Kinetics", Journal of Power Sources, vol. 356 (2017), pp. 80-38.

Wan, F. et al., "Nanoeffects Promote the Electrochemical Properties of Organic Na2C8H4O4 as Anode Material for Sodium-Ion Batteries", Nano Energy, vol. 13 (2015), pp. 450-457.

Jolley, A.G. et al., "Improving the Ionic Conductivity of NaSiCON Through Aliovalent Cation Substitution of Na3Zr2Si2PO12", Ionics, vol. 21 (2015), pp. 3031-3038.

Jolley, A.G. et al., "Structural Investigation of Monoclinic-Rhombohedral Phase Transition in Na3Zr2Si2PO12 and Doped NaSiCON", J. Am. Ceram. Soc., vol. 98 (2015), pp. 2902-2907.

Lu, X. et al., "Advanced Materials for Sodium-Beta Alumina Batteries: Status, Challenges and Perspectives", Journal of Power Sources, vol. 195 (2010), pp. 2431-2442.

Lu, X. et al. "The Effects of Temperature on the Electrochemical Performance of Sodium-Nickel Chloride Batteries", Journal of Power Sources, vol. 215 (2012), pp. 288-095.

Kim, J. et al., "Low Temperature Performance of Sodium-Nickel Chloride Batteries with NaSiCON Solid Electrolyte" Journal of Electroanalytical Chemistry, vol. 759 (2015), pp. 201-206.

Zhao, Y. et al., "High-Performance Rechargeable Lithium-Iodine Batteries Using Triiodide/Iodide Redox Couples in an Aqueous Cathode", Nature Communications, vol. 4, 1896 (2013),. 7 pages.

Small, L.J. et al., "Next Generation Molten NaI Batteries for Grid Scale Energy Storage", Journal of Power Sources, vol. 360 (2017), pp. 569-574.

Percival, S. et al., "Electrochemistry of the NaI—AlCl3 Molten Salt System for Use as Catholyte in Sodium Metal Batteries", Journal of the Electrochemical Society, vol. 165(14) (2018), pp. A3531-A3536.

* cited by examiner

MOLTEN INORGANIC ELECTROLYTES FOR LOW TEMPERATURE SODIUM BATTERIES

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to molten alkali metal batteries and, in particular, to molten inorganic electrolytes for low temperature molten sodium batteries.

BACKGROUND OF THE INVENTION

Low temperature molten salts offer promise as electrolytes in the development of safe, reliable, grid-scale batteries. See J. B. Goodenough, *Energy Environ. Sci.* 7, 14 (2014); and Z. Yang et al., *Chem. Rev.* 111, 3577 (2011). In particular, molten sodium batteries are promising candidates for high energy density, low cost grid-scale energy storage that could be enabled by effective low temperature molten salt catholytes. See S. Ha et al., *ChemPhysChem* 15, 1971 (2014). However, well-known sodium metal battery systems, such as the Na—S system or the ZEBRA (Na—$NiCl_2$) battery system, typically operate at temperatures in excess of 275° C. See J. L. Sudworth, *J. Power Sources* 100, 149 (2001); J. Kummer and N. Weber, "A Sodium-Sulfur Secondary Battery," SAE—1967 Transactions, Number V76-A, published 1974 Dec. 1; and D. Kumar et al., *Solid State Ionics* 312, 8 (2017). To realize the cost-effective potential of these batteries, certain challenges must be addressed such as lowering the operating temperature and identifying compositions, which in the event of assembly failure, will not react in a hazardous manner. See B. Dunn et al., *Science* 334, 928 (2011); and K. B. Hueso et al., *Energy Environ. Sci.* 6, 734 (2013). New chemistries are being investigated and optimized with the goal of a safe, scalable battery assembly that has high efficiency and capacity. See X. Lu et al., *Nat. Commun.* 5, 4578 (2014). In some reports, room temperature operation has been demonstrated in lab scale tests for sodium metal batteries, but flammable organic solvents or highly reactive aqueous solvent are still used in the catholyte, creating a safety hazard. See A. Manthiram and X. Yu, *Small* 11, 2108 (2015); and C. Liu et al., *ACS Appl. Mater. Interfaces* 8, 1545 (2016).

Reducing the operating temperature would improve battery material lifetimes, decrease operating costs, and enable use of lower temperature compatible and lower cost materials, leading to an overall more cost-effective, scalable sodium battery. Therefore, a need remains for a fully inorganic, non-volatile molten salt with a melting temperature near or below the melting temperature of sodium (~98° C.).

SUMMARY OF THE INVENTION

The present invention is directed to a family of low temperature molten sodium batteries that leverage a liquid, fully inorganic molten salt catholyte for safe, long-lifetime energy storage. The inorganic molten salt catholyte comprises at least one sodium halide and at least one metal halide. For example, mixing NaI with $GaCl_3$, or similar metal-halide salts, yields a liquid catholyte with a melting point less than 100° C. and redox-active $I^-$ concentrations of approximately 10 M. This high $I^-$ concentration enables fast kinetics and theoretical energy densities of up to 500 Wh/L. Moreover, the use of a liquid anode (sodium or sodium-alloy) avoids dendrite formation, while a liquid cathode (catholyte) precludes lifetime-limiting plating or intercalation reactions inherently limiting other commercialized chemistries. An inert solid phase cathode current collector can be used. The cathode current currently is not intentionally oxidized or reduced during battery operation; it simply provides or extracts electrons from the fully liquid catholyte. This is in contrast to many ZEBRA chemistries where the electrode (e.g. Ni, Zn, Fe) reacts with the electrolyte. A battery operating temperature of <100° C. enables use of inexpensive plastic seals, as opposed to welds, while the fully inorganic nature of the active battery components enhances safety by eliminating concerns of thermal runaway or explosion from flammable gas generation. This safe, inexpensive, energy dense chemistry offers a potentially long-lifetime energy storage solution.

BRIEF DESCRIPTION OF THE DRAWINGS

The detailed description will refer to the following drawings, wherein like elements are referred to by like numbers.

FIG. 2B shows that $GaCl_3$ salts are fully molten at 90° C.

DETAILED DESCRIPTION OF THE INVENTION

Figure 1:
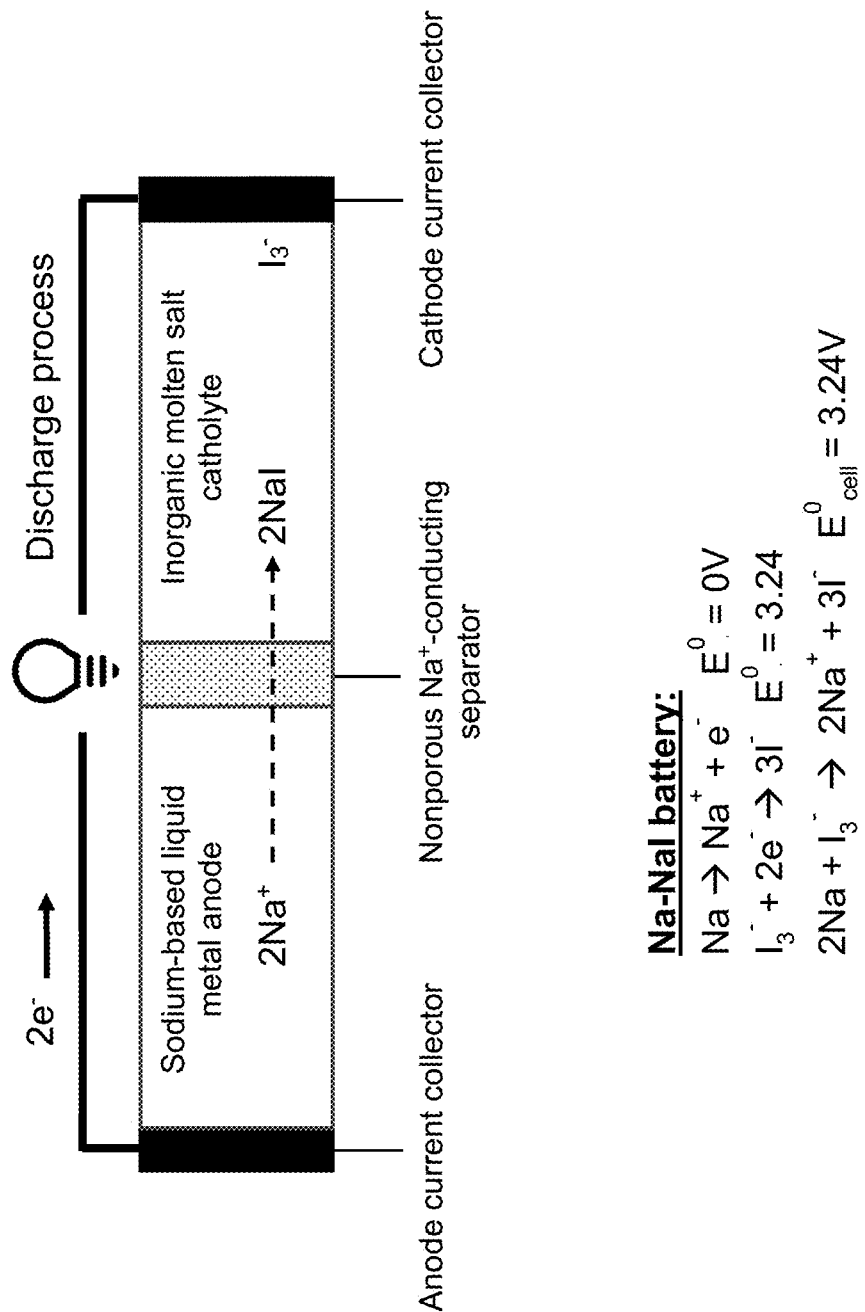
FIG. 1 is a schematic illustration of an exemplary molten sodium halide battery, with anode and cathode reactions and their standard state potentials.

A schematic illustration of a molten sodium halide battery is shown in FIG. 1. The low temperature, inorganic molten sodium battery comprises a sodium-based liquid metal anode, a nonporous $Na^+$ conducting separator, an inorganic molten salt catholyte, and anode and cathode current collectors. Unlike previous sodium batteries which operate at a minimum of 120° C., and more practically 200° C., the present invention provides a molten sodium battery that can operate at <100° C. with fully inorganic active components.

The sodium-based liquid metal anode can comprise pure molten sodium metal or an alloy of sodium and other alkali metal(s), such as potassium or cesium. Other alloying metals, such as zinc, indium, or antimony, which reduce the melting temperature of the sodium alloy, can also be used. Liquid sodium is a preferable anode material, due to its high energy density, electrochemical reversibility, high electrical conductivity ($10^5$ S/cm), low melting point (98° C.), and earth abundance. See S. Ha et al., *ChemPhysChem* 15, 1971 (2014); K. Hueso et al., *Energy Environ. Sci.* 6, 734 (2013); W.-L. Pang et al., *J. Power Sources* 356, 80 (2017); and F. Wan et al., *Nano Energy* 13, 450 (2015). Moreover, liquid metal anodes can avoid dendrite growth issues that plague solid zinc and lithium metal anodes. See X. Lu et al., *Nat. Commun.* 5, 4578 (2014).

The separator electrically isolates the two electrolytes (anode and cathode) and allows conduction of inert salt ions to maintain charge balance across the two electrolytes. Preferably, a zero-crossover separator selectively favors transport of the desired charge carrier, Na$^+$, and prevents transport of redox-active molecules and solvents that can contribute to capacity loss. The nonporous Na$^+$-conducting separator can comprise NaSICON (nominally Na$_{1+x}$Zr$_2$Si$_x$P$_{3-x}$O$_{12}$), β"-Al$_2$O$_3$, other solid Na$^+$ conductors, or a composite of these conductors and an inert component. In particular, NaSICON retains significant conductivity at temperatures <200° C. and is a mechanically robust ceramic separator that is stable against liquid sodium. See A. Jolley et al., *Ionics* 21, 3031 (2015); A. Jolley et al., *J. Amer. Ceram. Soc.* 98, 2902 (2015); X. Lu et al., *J. Power Sources* 195, 2431 (2010); X. Lu et al., *J. Power Sources* 215, 288 (2012); and J. Kim et al., *J. Electroanal. Chem.* 759, 201 (2015).

The fully liquid, molten salt cathode can comprise NaF, NaCl, NaBr, or NaI mixed with a metal halide salt of the formula MX$_y$, where M is an alkaline earth metal, such as Mg, Ca, Sr, or Ba; an early transition metal, such as Nb, Ta, Mo, or W$^-$; or a post-transition metal, such as Ga, In, Sn, Sb, or Bi; and X is a halogen, such as F, Cl, Br, or I; and y is the number of halogen atoms in the compound, that provides a low melting temperature (e.g., <100° C.). The molten salt catholyte can comprise binary, ternary or quaternary mixtures of the above compounds. The molten salt catholyte can further comprise mixtures of these compounds with an aluminum halide, such as AlCl$_3$, AlBr$_3$, or AlI$_3$. The molten salt catholyte preferably comprises a mixture of a sodium halide and a gallium halide. Any of the other metal halides can be added to the sodium halide/gallium halide mixture in relatively small amounts to help depress melting point or improve conductivity of the mixture. The mixture preferably comprises between 5 and 25 mol % sodium halide.

As an example, the catholyte can make use of the reversible iodide/triiodide redox couple to store and release charge and which has been shown to have a high energy density. See Y. Zhao et al., *Nat. Commun.* 4, 1896 (2013). Upon charging, Na$^+$ is drawn from the molten salt cathode through the separator and reduced onto the molten sodium-based anode, while (for NaI-containing salts) a I$^-$-containing complex is oxidized via two-electron transfer to I$_3^-$ in the molten salt cathode. When discharging, Na$^0$ from the molten anode is oxidized to Na$^+$ and transported through the separator into the molten salt cathode, while I$_3^-$ in the catholyte is reduced to I$^-$ at the cathode current collector, as shown in FIG. 1. Depending on the chosen chemistry and operating temperature, operating voltages of 2.8-3.6 V are expected. See A. Bard and L. Faulkner, *Electrochemical Methods: Fundamentals and Applications*, second. Ed., Wiley (2000). This chemistry is unique from other sodium batteries which leverage inorganic molten salts, such as ZEBRA-style batteries, in that the current collector does not react with the catholyte. Instead the cathode current collector merely oxidizes or reduces the catholyte during charging and discharging (i.e., extracts electrons from the fully liquid catholyte during charging and injects electrons into the catholyte during discharging). Thus, inert solid materials such as tungsten or graphite can be used for the cathode current collector, while electroactive materials such as Fe, Zn, or Ni can be avoided.

Figures 2A, 2B:
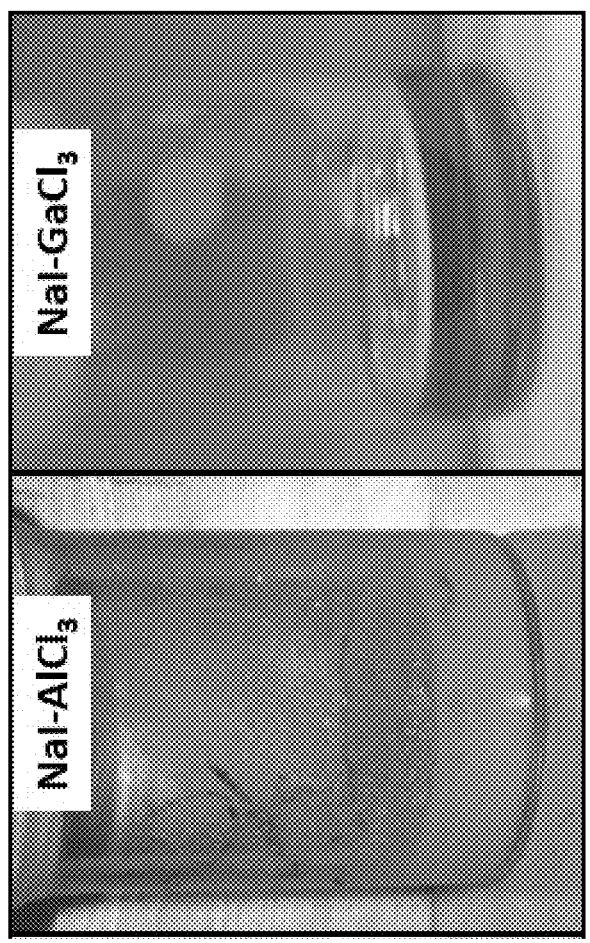
FIGS. 2A-2B are photographs of different molten salts at 90° C. The molten salts are composed of 25 mol % NaI and 75 mol % $AlCl_3$ or $GaCl_3$, respectively. The photograph in FIG. 2A shows that a $AlCl_3$ composition is still solid at 90° C.

As examples of the invention, several combinations of NaI with GaCl$_3$ were tested. 25 mol % NaI with 75 mol % GaCl$_3$ is fully molten at 90° C. The NaI—GaCl$_3$ system has a fully molten capacity range of at least 5 to 25 mol % NaI. A photograph of this molten salt at 90° C. is shown in FIG. 2B and compared to a solid NaI—AlCl$_3$ salt in FIG. 2A used in a previously demonstrated inorganic sodium battery that requires temperatures >120° C. for successful operation. In the NaI—AlCl$_3$ system, it was found that the presence of material phases other than the molten salt liquid, especially near the electrode in the diffusion layer of the reactant, can significantly hinder mass and charge transport phenomena critical to optimal battery performance during cycling. These detrimental secondary phases can include gas phases or solid salt particle phases. In particular, if there are undissolved solids present in the liquid melt, they can impede or block reactant diffusion to the electrode surface and lock up a significant portion of the reactant, preventing its electrochemical utilization and lowering overall battery capacity. See L. J. Small et al., *J. Power Sources* 360, 569 (2017); and S. J. Percival et al., *J. Electrochem. Soc.* 165(14), A3531 (2018). The specific electrolyte compositions of the present invention enable significantly lower temperature sodium battery operation. In particular, a fully molten catholyte avoids the particle-hindered electrochemical processes and particle-related loss of capacity observed with the NaI—AlCl$_3$ system.

Figure 3:
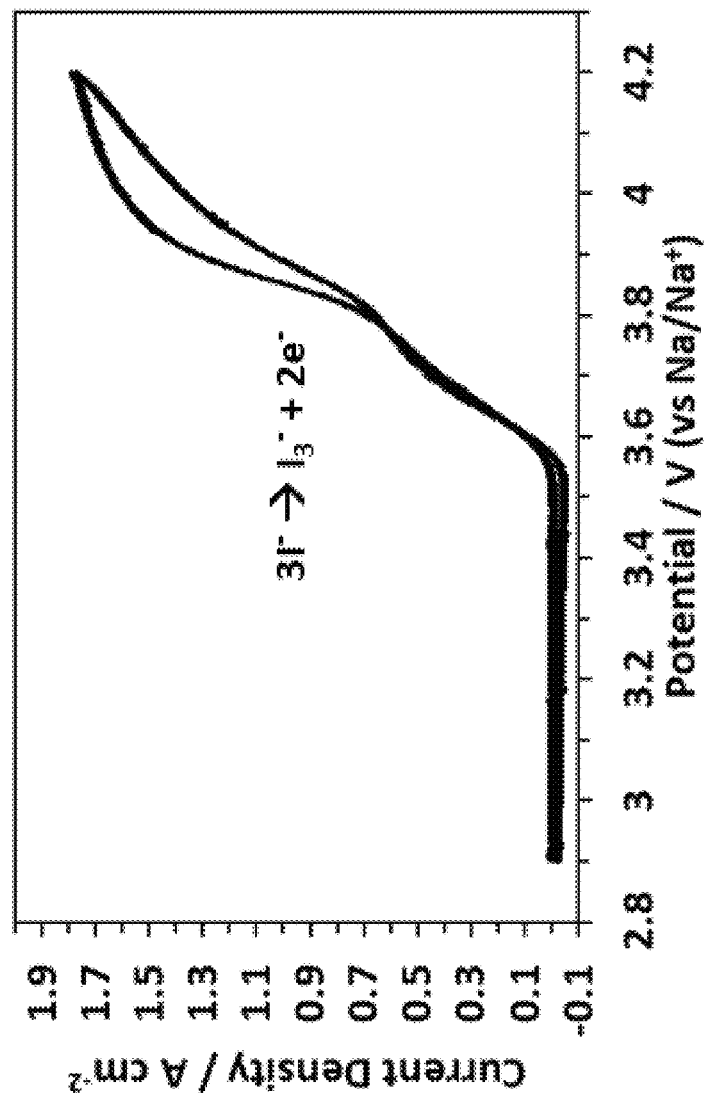
FIG. 3 is a cyclic voltammogram from a carbon fiber microelectrode showing the oxidation of iodide starting at 3.6 V (versus a $Na/Na^+$ reference) in the 25 mol % NaI 75 mol % $GaCl_3$ molten salt. Scan rate was 100 mV/s and the temperature was 90° C.

Electrochemical characterization for a 25 mol % NaI with 75 mol % GaCl$_3$ salt at 90° C. was performed using cyclic voltammetry, as plotted in FIG. 3. The NaI—GaCl$_3$ system shows good iodide electrochemical behavior. The oxidation of I$^-$ to I$_3^-$ (charging) is seen above 3.6 V (versus a Na/Na$^+$ reference). The reduction of Ga$^{3+}$ to Ga$^0$ is observed at 2.6 V (not shown). Thus, 1.0 V of overpotential is available in the catholyte during I$_3^-$ reduction (discharge) without harming the cathode or reducing gallium from the electrolyte.

This invention improves on three key weakness of commercial batteries: cost, safety, and lifetime. Cost is greatly reduced by using sodium, instead of lithium used in industry-standard lithium-ion batteries. While systems such as sodium-sulfur have even lower materials costs, due to the lower cost of S vs. I$_2$, these systems operate near 300° C. and require extensive thermal management, and expensive hermetic sealing technologies. The low temperature operation of the molten sodium battery enables lower material and processing costs, reduced operation costs, and simplified heat management.

The safety of these batteries is attributed to the use of fully inorganic active components. Upon simulated internal discharge of a higher operating temperature GaCl$_3$—NaI cathode, only aluminum metal and a harmless sodium halide salt (e.g. NaCl) was formed, along with minimal heat and no recordable gas evolution. Thus, these fully inorganic active components eliminate concerns of explosion from buildup of flammable gases and the creation of a thermal runaway event. With improved safety, larger cells necessary for grid-scale storage can be fabricated, enabling further cost reductions and increasing ease of cell-level integrated power management.

Finally, the low temperature molten sodium battery offers improved lifetime, due to reduced material degradation, decreased reagent volatility, and fewer side reactions. The use of fully liquid reactions precludes dendrite formation in the anode and eliminates plating or intercalation reactions in the cathode. Elimination of these failure mechanisms, common in Li-ion and Zn—MnO$_2$ batteries, is expected to lengthen Na battery lifetime beyond 10,000 cycles and drive down the levelized cost of operation. Such long cycle life is necessary for reliable grid scale storage applications.

The present invention has been described as a molten salt electrolyte for a low temperature sodium battery. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An inorganic molten salt catholyte for electrochemical energy storage, comprising at least one sodium halide of the formula NaF, NaCl, NaBr, or NaI mixed with at least one gallium halide and at least one aluminum halide of the formula $AlCl_3$, $AlBr_3$, or $AlI_3$, wherein the inorganic molten salt catholyte comprises between 5 and 25 mol % sodium halide and wherein the inorganic molten salt catholyte is fully liquid at a temperature less than 120° C.

2. The inorganic molten salt catholyte of claim 1, wherein the inorganic molten salt catholyte comprises NaI and $GaCl_3$.

3. The inorganic molten salt catholyte of claim 1, wherein the inorganic molten salt catholyte comprises a binary, ternary, or quaternary mixture of the at least one sodium halide and the at least one metal halide salt.

4. The inorganic molten salt catholyte of claim 1, wherein the inorganic molten salt catholyte is fully liquid at a temperature less than 100° C.

5. A low temperature sodium battery, comprising:
an anode current collector,
a sodium-based liquid metal anode,
a nonporous $Na^+$-conducting separator,
an inorganic molten salt catholyte comprising at least one sodium halide of the formula NaF, NaCl, NaBr, or NaI, mixed with at least one gallium halide and at least one aluminum halide of the formula $AlCl_3$, $AlBr_3$, or $AlI_3$, wherein the mixture comprises between 5 and 25 mol % sodium halide and wherein the inorganic molten salt catholyte is fully liquid at a temperature less than 120° C., and
an inert cathode current collector.

6. The low temperature sodium battery of claim 5, wherein the sodium-based liquid metal anode comprises molten sodium metal or an alloy of sodium and at least one other alkali metal.

7. The low temperature sodium battery of claim 5, wherein the nonporous $Na^+$-conducting separator comprises NaSICON, $\beta''-Al_2O_3$, or a solid $Na^+$ conductor, or a composite thereof.

8. The low temperature sodium battery of claim 7, wherein the nonporous $Na^+$-conducting separator further comprises an inert material.

9. The low temperature sodium battery of claim 5, wherein the inorganic molten salt catholyte comprises NaI and $GaCl_3$.

10. The low temperature sodium battery of claim 5, wherein the inorganic molten salt catholyte comprises a binary, ternary, or quaternary mixture of the at least one sodium halide and the at least one metal halide salt.

11. The low temperature sodium battery of claim 5, wherein the inorganic molten salt catholyte is fully liquid at a temperature less than 100° C.

12. The low temperature sodium battery of claim 5, wherein the inert cathode current collector comprises graphite, carbon felt, or a carbon powder.

13. The inorganic molten salt catholyte, further comprising at least one metal halide salt of the formula $MX_y$, where M=Mg, Ca, Sr, Ba, Nb, Ta, Mo, W, In, Sn, Sb, or Bi, and X=F, Cl, Br, or I; and y is the number of halogen atoms in the metal halide salt.

14. The low temperature sodium battery of claim 5, wherein the inorganic molten salt catholyte further comprises at least one metal halide salt of the formula $MX_y$, where M=Mg, Ca, Sr, Ba, Nb, Ta, Mo, W, In, Sn, Sb, or Bi, and X=F, Cl, Br, or I; and y is the number of halogen atoms in the metal halide salt.

* * * * *